United States Patent [19]

Reese

[11] 4,400,909

[45] Aug. 30, 1983

[54] PLANT PROTECTOR WITH HEAT SINK AND PESTICIDE PACKET

[76] Inventor: Stanton L. Reese, 726 Laurel La., Lakeland, Fla. 33803

[21] Appl. No.: 231,364

[22] Filed: Feb. 3, 1981

Related U.S. Application Data

[63] Continuation-in-part of Ser. No. 90,079, Oct. 31, 1979, Pat. No. 4,341,039, which is a continuation-in-part of Ser. No. 971,184, Dec. 20, 1978, abandoned.

[51] Int. Cl.$^3$ .................... A01G 13/00; A01M 1/18
[52] U.S. Cl. ......................................... 47/2; 43/108; 43/126; 43/131; 47/23; 47/24; 47/DIG. 7; 239/55; 239/56
[58] Field of Search ................ 43/108, 126, 129, 131; 47/2, 23, 24; 239/53-56

[56] References Cited

U.S. PATENT DOCUMENTS

| | | | |
|---|---|---|---|
| 135,685 | 11/1873 | Ayers | 47/23 |
| 635,397 | 10/1899 | Schlaefer | 47/24 |
| 1,442,367 | 1/1923 | Stevens | 47/2 X |
| 1,991,938 | 2/1935 | Houghton | 43/129 |
| 1,994,101 | 3/1935 | Hawkins | 43/108 |
| 2,240,766 | 5/1941 | Elder | 43/108 |
| 2,947,111 | 8/1960 | Zobrist | 47/24 X |
| 3,206,892 | 9/1965 | Telkes et al. | 47/9 X |
| 3,218,759 | 11/1965 | Barrons | 47/30 |
| 3,466,799 | 9/1969 | Stilson | 47/21 |
| 3,623,659 | 11/1971 | Maierson | 43/129 X |
| 3,858,807 | 1/1975 | Rabussier et al. | 239/56 |
| 4,071,974 | 2/1978 | Tripp, Jr. | 47/2 |
| 4,130,245 | 12/1978 | Bryson | 239/56 X |
| 4,137,667 | 2/1979 | Wallace et al. | 47/26 |
| 4,161,283 | 7/1979 | Hyman | 239/55 |

FOREIGN PATENT DOCUMENTS

| | | | |
|---|---|---|---|
| 876491 | 5/1953 | Fed. Rep. of Germany | 47/23 |
| 1953652 | 5/1971 | Fed. Rep. of Germany | 47/26 |
| 444859 | 10/1912 | France | 47/24 |
| 585505 | 1/1977 | Switzerland | 43/129 |
| 903989 | 8/1962 | United Kingdom | 43/129 |
| 1144366 | 3/1969 | United Kingdom | 47/2 |

OTHER PUBLICATIONS

Manufacturer's Literature describing "Reese Clip-On" Plant protector.
Manufacturer's Literature describing "Diazinon 50W" Insecticide.
Article entitled "The use of Insulating Wraps for Protection of Citrus Trees From Freeze Damage," *Proceedings First International Citrus Symposium*, vol. 2, 1969.
Manufacturer's Literature entitled "Urethane Foam Tree Wraps," by Austin Urethane, Inc.
Circular No. 283 dated May, 1965 entitled "Banking Young Citrus," Fred P. Lawrence, Agricultural Extension Service, Univ. of Florida, Gainesville.
Article entitled "Soil Banks or Fiberglas Wraps for Young Citrus Trees?," *The Citrus Industry*, Jan. 1969.
*Modern Plastics Encyclopedia*, vol. 48, No. 10A, Oct. 1971, pp. 72, 77, 80, 624 and 625.
*The Merck Index*, Ninth Edition, pp. 263 and 435.

*Primary Examiner*—Steven A. Bratlie
*Attorney, Agent, or Firm*—Fleit, Jacobson & Cohn

[57] ABSTRACT

A method and device for applying pesticides to growing plants or portions of plants is described in which an area to be protected is enclosed and a small amount of pesticide contained in a packet is placed within the enclosure. The packet protects the pesticide from loss or destruction by water and permits pesticide vapors to escape at a rate sufficient to make the enclosed area untenable to certain pests for an extended period of time. The packet is preferably made from low density polyethylene, an ethylene-vinyl acetate copolymer or a combination of the two, and the pesticide is preferably a diethyl phosphorothioate insecticide. In the preferred embodiment of the device, the device also acts as an insulator and includes liquid receiving pockets to act as "heat sinks" to protect the trunk from below freezing temperatures.

9 Claims, 4 Drawing Figures

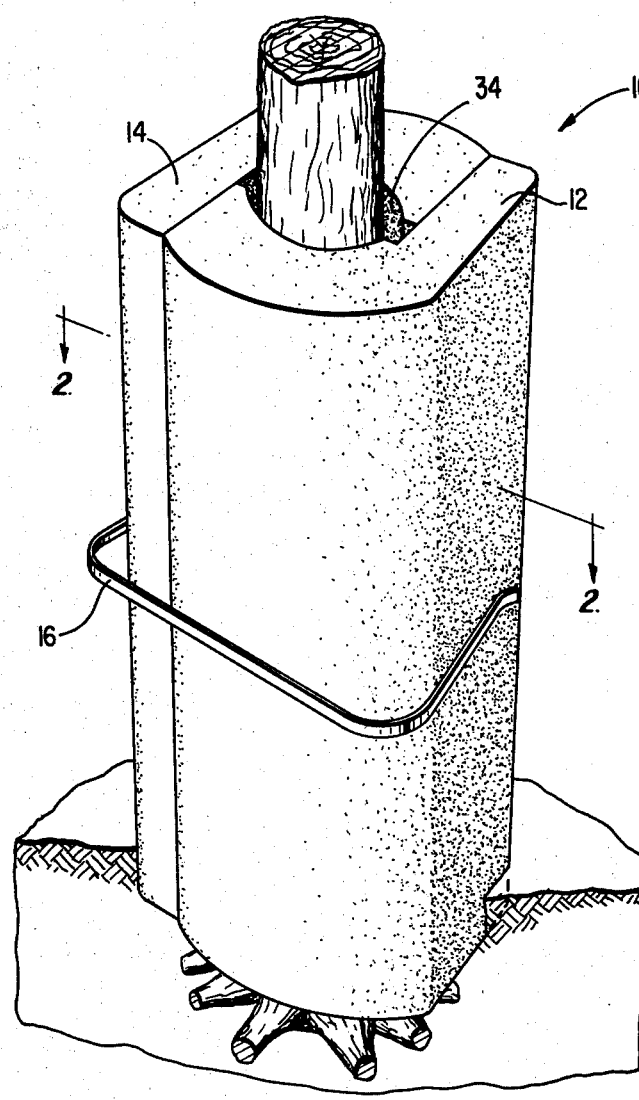
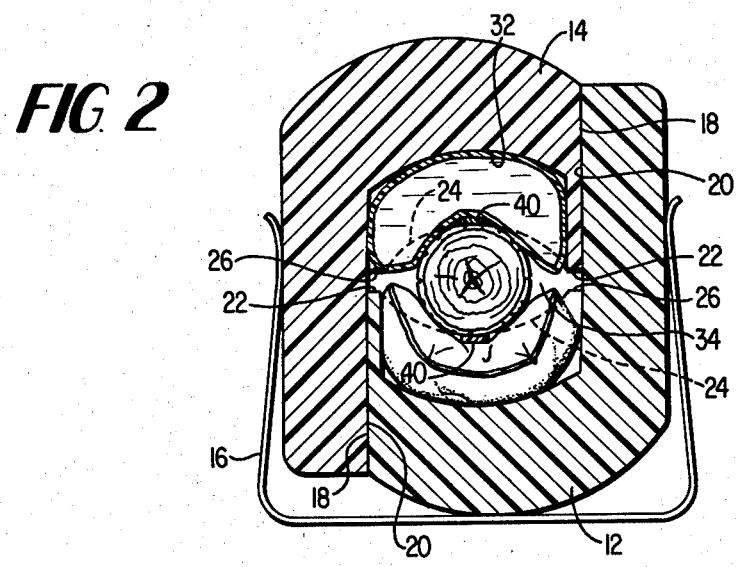

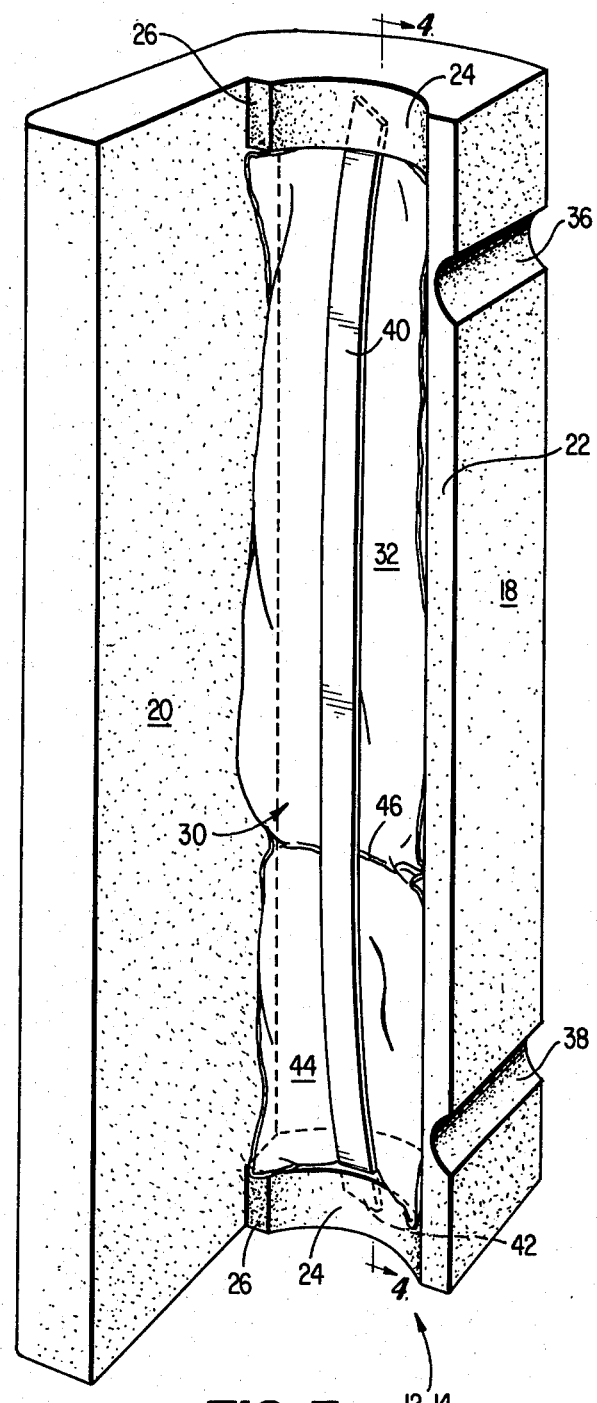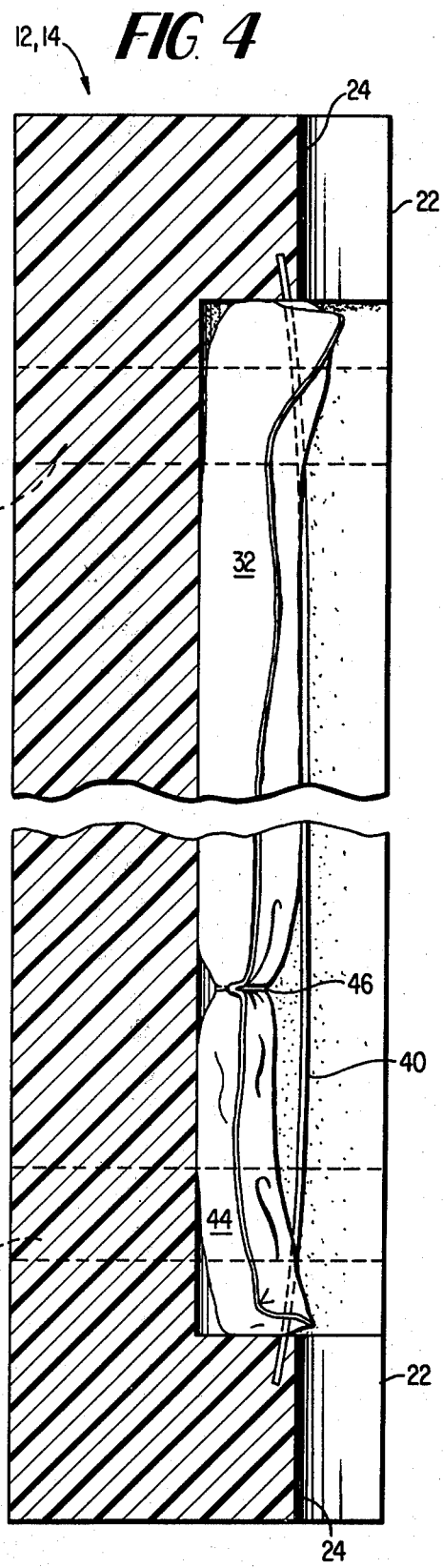
FIG. 3
FIG. 4

PLANT PROTECTOR WITH HEAT SINK AND PESTICIDE PACKET

CROSS-REFERENCE TO RELATED APPLICATIONS

This application is a continuation-in-part of Ser. No. 90,079, filed Oct. 31, 1979, now U.S. Pat. No. 4,341,039 which is a continuation-in-part of Ser. No. 971,184, filed Dec. 20, 1978, now abandoned, the disclosures of which are expressly incorporated herein by reference.

BACKGROUND OF THE INVENTION

This invention relates to an improved method and device for applying pesticides to repel insects and the like that prey on plants.

In the growing of plants, such as young citrus trees, insulating the relatively tender trunk of the young tree against cold is practiced in many regions of the world to prevent loss of the fruiting wood by freezing. The insulation may take the form of earth piled up around the tree trunk, or glass wool or polyurethane batts wrapped around the tree trunk. Preferably, the insulation comprises a semi-rigid insulator as described in my prior applications cross-referenced above that automatically adjusts with tree growth and which is provided with cavities housing pouches of solution. These solutions release energy and thus keep the trunk above the temperature at which it would suffer damage under conditions of severe cold.

When installing these various cold protection devices, it is common practice to apply pesticides to protect the covered surface of the tree from attack by insects and even to repel rodents which burrow under soil banks when that type of protection is used. It is also common practice to apply a fungicide at this time in an effort to ward off fungus infection and particularly *phytophthora parasitica* which destroys the bark and, when it has circled the trunk, kills the tree. In practice, these pesticides have limited effectiveness because they are quickly disseminated by rain or irrigation water, or they decompose by hydrolysis or other means and become ineffective, or they may be lost by evaporation. This is a major disadvantage to the grower who must go to the expense of applying pesticides quite frequently to gain even partial protection from damage or disease.

Accordingly, it is an object of the present invention to provide an improved method and device for the application of pesticides to repel insects and the like and to protect plants from attack by pests.

It is a further object of the present invention to provide an improved means of applying pesticides so that the pesticides have a relatively long period of effectiveness.

It is a still further object of the present invention to provide an improved means of applying pesticides with just one application.

Yet a further object of the present invention is to provide a means of applying pesticides in combination with means for insulating a plant.

Other objects and advantages of the invention will become apparent on reading the undergoing specification and claims.

SUMMARY OF THE INVENTION

In accordance with the present invention, pesticides are applied to growing plants by enclosing the area to be protected and placing within the enclosure a small amount of pesticide contained in a packet. The packet protects the pesticide from loss or destruction by water and yet permits pesticide vapors to escape at a rate sufficient to make the micro-environment of the space within the enclosed area untenable to certain pests for an extended period of time.

The present invention is based on the discovery that certain pesticides, when enclosed in a film formed of such materials as low density polyethylene or ethylene-vinyl acetate copolymer, will emit vapors which escape through the film at a sufficient rate that even a relatively small packet of pesticide will make the interior of an enclosure, such as an insulator composed of expanded polystyrene, intolerable to destructive insects such as certain ants, crickets and the like. The preferred pesticide is a diethyl phosphorothioate of the O,O-diethyl O-(2-isopropyl-6-methyl-4-pyrimidinyl) phosphorothioate composition which is a commercially available insecticide having the name Diazinon.

In accordance with the present invention, the pesticide is slowly released and thus acts for a relatively long period of time to repel destructive pests. Since the pesticide is housed in a packet composed of a material that repels water, the pesticide is not quickly disseminated by rain or irrigation water. Also, the pesticide does not decompose by hydrolysis or other means and become ineffective, or become lost by evaporation. In addition, the packet containing the pesticide can be incorporated into a plant insulator so that the plant is protected from cold as well as destructive pests.

As stated previously, a fungicide is generally applied to the young tree trunk to protect it against the often deadly phytophthora fungus. I have discovered that certain ants chew holes in the bark of the tree to obtain juice and that this open wound almost immediately leads to fungal infection causing the young tree to decline and die. The use of the pesticide packet of this invention inside a suitable enclosure eliminates bark punctures by insects, thus eliminating the need for and cost of a fungicide.

Another advantage of the present invention is that field workers are not exposed to pesticide dust or spray as is the case in previous methods of pesticide application. This is a substantial advantage in view of the potential health hazards which may be involved in pesticide application.

BRIEF DESCRIPTION OF THE DRAWINGS

In the detailed description of the preferred embodiment of the invention presented below, reference is made to the accompanying drawings, in which:

FIG. 1 is a perspective view of a plant insulator incorporating a pesticide packet of the present invention positioned on a young tree to protect it;

FIG. 2 is a cross-sectional view along line 2—2 of FIG. 1;

FIG. 3 is a perspective view of one-half of the plant insulator of FIG. 1; and

FIG. 4 is a cross-sectional view of the plant insulator along line 4—4 of FIG. 3 and shows the container in side elevation.

DESCRIPTION OF THE PREFERRED EMBODIMENTS

Because tree and plant protection methods and devices are well-known, the present description will be directed in particular to elements forming part of, or cooperating more directly with, the present invention. Elements not specifically shown or described herein are understood to be selectable from those known in the art.

In the present invention, a pesticide is enclosed or housed in a packet which will permit vapors of the pesticide to escape at a sufficient rate to make the interior of an enclosure, such as an insulator composed of expanded polystyrene, intolerable to destructive insects or the like so that pests are repelled. The packet is made from a film formed of a material, such as low density polyethylene (LDPE), ethylene-vinyl acetate copolymer (EVA), or combinations of the two, which is water repellant and yet is permeable to pesticide vapors. With respect to the low density polyethylene and ethylene-vinyl acetate copolymer combination, the mixture preferably contains up to about 10% by weight of ethylene-vinyl acetate copolymer, more preferably about 3.5 to 5% by weight of ethylene-vinyl acetate copolymer.

The pesticide employed should have a sufficient vapor pressure so that the pesticide vapors will penetrate the low density polyethylene or ethylene-vinyl acetate copolymer film or the like. The preferred pesticide is a diethyl phosphorothioate insecticide of the O,O-diethyl O-(2-isopropyl-6-methyl-4-pyrimidinyl) phosphorothioate composition which has a vapor pressure of about $1.4 \times 10^{-4}$ bar at 20° C. This insecticide, commercially available under the name Diazinon from CIBA-GEIGY Corporation, Greensboro, N.C., is often mixed with particulate and sold as a wettable powder or in granular form. Water gradually hydrolyses Diazinon, causing it to become ineffective. However, the insecticide is protected by being enclosed in the film of low density polyethylene, ethylene-vinyl acetate copolymer or a mixture of the two.

Diazinon is a general insecticide claimed to be effective against a wide range of insects when the insect is physically contacted with the insecticide as a liquid dispersed in water. However, I have discovered that, in addition, Diazinon vapors are effective in protecting a relatively enclosed space from insect infestation, particularly by ants.

More particularly, I have discovered that as little as one (1) gram of Diazinon, when sealed inside a pouch made of low density polyethylene film five (5) mils thick having a surface area of fifteen (15) square inches will emit sufficient vapors to the space inside an enclosure, such as an insulator composed of expanded polystyrene, that it will cause most insects to avoid this cavity.

An insecticide which I also have found to be effective is commercial chlordane. The pure compound is 1,2,4,5,6,7,8,8-octachloro-2,3,3a,4,7,7a-hexahydro-4,7-methano-1H-indene. The commercial product is a mixture containing about 60 to 75% of the pure compound and 25 to 40% of related compounds. Chlordane is a fumigant, which is also effective against ants. Although chlordane presently has a very restrictive label (see *The Merck Index*, 9th Edition, 1976, No. 2051, page 263), it is representative of pesticides which can be used in accordance with the present invention.

Commercial chlordane has a vapor pressure of about $1 \times 10^{-5}$ bar at 20° C. When using a pesticide having a very low vapor pressure, such as commerical chlordane, it is preferred to punch holes in the packet near the bottom to facilitate vapor release. The holes, typically about 1/16 to ⅛ inch in diameter, facilitate the release of vapor while the insecticide is protected against excessive dissipation by rain water.

There are a number of factors that influence the effectiveness of the pesticide including:

(1) the vapor pressure of the pesticide at the temperatures and pressures found in a given application;

(2) the relative toxicity of the pesticide to the pests, particularly insects of concern;

(3) the surface area of the packet through which the vapors must pass;

(4) the wall thickness of the film (i.e., the rate of vapor passage is inversely proportional to the wall thickness);

(5) the composition of the film (i.e., low density polyethylene and ethylene-vinyl acetate copolymers permit good vapor flow while high density polyethylene or polyvinylidene chloride do not permit satisfactory vapor flow);

(6) the size of the cavity that the vapors must fill which varies substantially, for example, from tree to tree due to differences in trunk size and shape;

(7) the size of the openings in the enclosure from which vapors can escape which vary significantly due to variations in enclosure fit; and (8) wind velocity since air flow dissipates pesticide vapors.

Fortunately, the pesticide vapor level does not have to be at a toxic level at all times to effectively protect the enclosed area from insect infestation. Thus, normal periods of warmth and low winds have proven to be sufficient to provide effective protection against insects. However, it should be appreciated that the exact form of application of the pesticide and the effectiveness thereof depend upon the factors discussed above.

Referring now the drawings, insulator 10 is comprised of halves 12 and 14 interconnected by a suitable spring mechanism, such as clip 16. Each of parts 12 and 14, which are substantially identical in shape, has substantially parallel faces 18 and 20 interconnected by, in sequence, a first planar face 22, semi-circular or elliptical recesses 24, and second faces 26 parallel with face 22. Each of parts 12 and 14 has an opening or cavity 30 formed therein for receiving a liquid container 32.

In one embodiment, the insulator is about 14 inches high (or long) and each of the parts 12 and 14 is about 3½ inches wide and 5 inches deep. The radius of curvature of recesses 24 is about 1¼ inches. The radius of curvature of the surface of cavity 30 is about 1⅞ inches. The cavity 30 starts 1¼ inches from one end of the insulator and extends for about 11½ inches. The thickness of insulation between face 18 and the cavity 30 is about ⅜ inch. It will be appreciated that the faces 18 and 20 of each of the parts 12 and 14 are substantially coplanar with each other when the insulator 10 is assembled so that contact is maintained between the faces during enlargement of the cavity 34 formed in the insulator 10. It will be appreciated that the preceding dimensions are merely illustrative of one embodiment of the present invention and can be increased or decreased, depending upon the intended use of the insulator.

As illustrated in FIG. 2, the spring 16 has two inwardly bent portions that exert forces on the members 12 and 14 that tend to keep the faces 18 and 20 of the parts 12 and 14 in contact with each other. The force exerted on the members 12 and 14 is preferably not so great that it causes deformation of the semi-rigid insulating material, such as expanded polystyrene, styrafoam, or polyurethane, forming the members. In one embodiment, a spring force of approximately two to three pounds has been found acceptable. This allows the cavity 34 to automatically expand in accordance with changes in the girth of the plant trunk.

While representative dimensions of an embodiment of the present invention has been described, it will be appreciated that the most practical thickness of the insulating wall in the illustrated embodiment of the present invention is that thickness which will protect the plant during the most likely periods of damaging cold, which most often occur several hours after dark and continue until sunrise. A temperature that will cause damage is usually 32° F. or below and the plant can usually withstand temperatures near the damage threshold for a longer period than colder temperatures. For example, most orange trees can withstand temperatures above 28° F. indefinitely without damage. If exposed to a temperature of 26° F. for more than 2 to 4 hours, damage is likely to occur. Accordingly, an average insulation thickness of 1.5 inches for a material with an effective K factor of 0.25 BTU per hour, per °F., per square foot of area, per inch of thickness, would prevent tree damage for about 13 hours in a typical situation.

In order to provide longer protection without increased thickness of insulation, or with even less insulation, a built-in source of additional heat is provided. More particularly, the container 32 contains liquid with a relatively high heat of fusion, and that freezes several degrees above the temperature at which the plant will suffer damage, such as water. A bag made of polyethylene film of suitable wall thickness, in which the liquid or solution is sealed, is a good example of an inexpensive container for the solution. As the temperature of the interior of the insulator reaches the freezing temperature of the solution, as occurs after several hours of exposure to below freezing temperatures, the container remains near that temperature until the solution gives up its heat of fusion, which, for water, is very substantial, i.e., 143 BTU per pound, compared to only one BTU per pound to cool water 1° F. Water is inexpensive and quite suitable as a heat sink for many applications. Since water, in some instances, supercools before freezing, suitable seeding particles, such as phenazine or silver iodide crystals, can be added to initiate crystallization of the water at or near its 32° F. temperature of freezing. Seeded water is particularly suited for citrus trees that are hardy to 28° F., compared to a freezing temperature of 32° F. for water. The cavities 30 in the two halves of the insulator can be designed to hold any desired quantity of water, but about 1 pound of water is deemed more than sufficient for citrus protection.

The heat of fusion released by this quantity of water, with an insulator having an average wall thickness of only 1.25 inches and a K factor of 0.25 BTU per hour, per °F., per square foot of area, per inch of thickness, will maintain the temperature at the tree above 28° F. for about sixty-four hours of continuous exposure to an ambient air temperature averaging 22° F., which exceeds the most severe conditions that are likely to occur in the citrus growing regions of the United States.

Horizontal ventilation slots 36 and 38 are formed in the face 18 so as to reduce or eliminate dampness which tends to build up on the lower portions of trunks protected by insulation devices, especially during rainy seasons. Preferably, the slots have a semi-cylindrical shape with a diameter of about 1 inch. The use of such vent slots has virtually no effect on the insulating properties of the insulator 10, as long as liquid in container 32 positioned in recess 30 is being frozen. The use of such ventilation slots provides quick drying of the trunk, thereby avoiding an environment that promotes growth of destructive fungus, such as *phytophthora*, one of the principal causes of citrus tree mortality. Further, the number and particular shape of the slots are not critical so long as the total area of the openings does not detract substantially from the insulating properties.

Considering the container 32 in more detail, it is preferably made of a suitable polyethylene material and is glued or otherwise secured within the recess 30, such as with a flat splint 40. A container or bag having a wall thickness of between 2 mils and 6 mils has been found to be suitable. One embodiment of the bag has an unfilled length of 10 inches and width of 3 inches. When filled, such bag contains about 180 to 220 grams of water. Preferably, a few milligrams of a crystallization initiator, such as phenazine or silver iodide crystals, are added to the water to avoid supercooling and maintain the freezing temperature until all the heat of fusion has been given up.

In order to keep the solution bag or container 32 from forming a water retaining pocket around the trunk, a splint 40 having pointed ends 42 is inserted into portions of the parts 12 and 14 on both ends of the recess 30. The splint is made of a stiff but resilient material, such as a suitable polyvinyl chloride, acrylonitrile-butadiene-styrene (ABS) terpolymer, or high impact styrene, so that the splint is bulged by the liquid in the container and makes contact with the tree in only one vertical line. Use of the splint insures that rain water has a chance to drain freely to the ground, which, in combination with the ventilation slots 36, 38 insures a relatively dry tree trunk. It is also possible to form the splint 40 from wood. If desired, the splint can be impregnated with an at least partially water soluble fungicide, such as $CuSO_4$, so that, as water runs down the trunk, the fungicide dissolves from the splint to protect the tree.

Another advantage of the insulating device containing a liquid heat source is that the thickness of insulation can be much less than is otherwise needed, without the solution, for equal protection, thus saving the cost of insulating material not used. A further advantage of this insulating device is that the heat released by the liquid as it cools tends to keep the plant temperature higher, affording protection for plants that have very little cold hardiness and, conversely, it protects the trunk from extremely high daytime temperatures in the summer.

The insulator 10 also includes a pesticide container 44. In the embodiment as illustrated, the pesticide container 44 is formed from the same polyethylene material as the container 32 and is formed by sealing, preferably heat-sealing, an end portion of the polyethylene bag along a seal line 46. The pesticide container or packet 44 is about 3 inches by 3 inches and contains a pesticide such as diazinon. If desired, perforations or holes (not shown) can be placed along the bottom of the pesticide container 44 adjacent to lower recess 24.

The following non-limiting examples further illustrate the invention:

EXAMPLE 1

An insulator which did not have a pesticide container was placed over a small vertical steel rod which had been set in the center of an active fire ant nest, which nest measured about 15 inches in diameter by about 6 inches high. A second insulator of the type illustrated in FIGS. 1–4 was placed in the same manner over another active fire ant nest very similar to the first. The second insulator contained 4 grams of Diazinon powder which included 50% by weight active ingredients. The powder was contained in a packet formed of a low density polyethylene and ethylene-vinyl acetate copolymer mixture containing about 3.5% by weight ethylene-vinyl acetate copolymer. The packet had 0.005 inch thick walls and an overall surface area of 15 square inches. Upon inspection the following day, no ants were observed at the bottom of the insulator containing the pesticide, whereas fire ants were actively moving about the bottom of the insulator without pesticide. After three months, the ants had worked sand well up into the insulator without pesticide incorporating the insulator into their nest. The ant hill was very active and of its original size. By contrast, there were no ants or sand inside the insulator with insecticide, the ant activity was quite low and the hill was about ⅛ its original height, thus demonstrating the effectiveness of this method of utilizing pesticides under the most extreme conditions.

EXAMPLE 2

Two one-year valencia orange trees which had insulators on them of the type illustrated in FIGS. 1-4 but without a pesticide packet were found to contain nests of large ants beneath them with ants working up into the cavity. The insulators were removed and a packet of Diazinon, as in Example 1, was placed at the bottom of the cavity in each and the insulators were immediately replaced around the two tree trunks. Upon inspection the next day, no ants were found in the insulator or under the tree. Three ants were found under the second insulator. Three days later, no insects of any kind were found in or under either insulator, again demonstrating the effectiveness of this technique.

EXAMPLE 3

A one-year valencia orange tree with an insulator of the type illustrated in FIGS. 1-4 but without a pesticide packet on it was found to contain a nest of large ants beneath it with ants working up into the cavity. The insulator was removed and one packet containing 15 grams of chlordane, which included 10% active ingredients, was inserted near the bottom of the cavity. The packet was formed from a film of low density polyethylene and ethylene-vinyl acetate copolymer containing about 3.5% ethylene-vinyl acetate copolymer and had a 0.005 inch wall thickness and about 15 square inches of surface area. The insulator was quickly reinstalled. After 24 hours, activity was somewhat lower. After three days, no ants were found inside the cavity but a few were found under the insulator. Conditions had not changed after 10 days. A second packet identical to the first was inserted. Thereafter, only one or two ants were found around the tree at each inspection, thus demonstrating that the method of pesticide utilization of this invention is also effective when chlordane is used.

Although certain pesticides have been described as being usable with the present invention, other pesticides with similar characteristics should be considered to be within the scope of the present invention. Also, other film compositions, thicknesses, packet sizes, and insulators and the like to provide enclosures for plants come within the scope of the present invention. Also, the invention has been described in detail with particular reference to a preferred embodiment thereof, but it will be understood that variations and modifications can be effected within the spirit and scope of the invention.

What is claimed is:

1. A self-expanding insulator for thermally insulating and protecting the trunk of a plant from pests which comprises:
   (a) two semi-rigid elements made of lighweight insulating materials which, when assembled, define a self-expanding cavity substantially in the center of the assembled elements;
   (b) means in cooperation with said elements for allowing automatic self-expansion of the cavity in accordance with changes in the girth of the trunk;
   (c) a packet containing a pesticide associated with the elements in position in close proximity to a substantial portion of the plant trunk, said packet protecting the pesticide from loss or destruction by water and permitting pesticide vapors to escape at a rate sufficient to repel pests from the closed area of the trunk of the plant to be protected; and
   (d) heat sink means associated with the elements in position in close proximity to a substantial portion of the plant trunk.

2. The device of claim 1 in which said packet is formed from a low density polyethylene or an ethylene-vinyl acetate copolymer or a mixture of the two.

3. The device of claim 2 in which said low density polyethylene and ethylene-vinyl acetate copolymer mixture contains up to about 10% by weight ethylene-vinyl acetate copolymer.

4. The device of claim 2 in which said low density polyethylene and ethylene-vinyl acetate copolymer mixture contains about 3.5 to 5% by weight ethylene-vinyl acetate copolymer.

5. The device of claim 1 in which said pesticide is a diethyl phosphorothioate insecticide.

6. The device of claim 1 in which said pesticide is O,O-diethyl O-(2-isopropyl-6-methyl-4-pyrimidinyl) phosphorothioate.

7. The device of claim 1 in which said heat sink means has a temperature of freezing above that temperature which causes damage to the plant and a high latent heat of fusion.

8. The device of claim 1 in which said heat sink means is water containing a silver iodide crystallization initiator which freezes at about 32° F. and gives up its latent heat of fusion to the protected plant trunk when the ambient air temperature is reduced below the freezing temperature of the heat sink means.

9. The insulator of claim 1 in which said heat sink means comprises a freezable container means which contains a liquid having a freezing temperature slightly above the temperature which causes damage to the plant to be protected.

* * * * *